(12) United States Patent
Addeo et al.

(10) Patent No.: US 8,107,474 B2
(45) Date of Patent: Jan. 31, 2012

(54) METHOD AND NETWORK NODE FOR MONITORING TRAFFIC IN A PRIVATE VLAN

(75) Inventors: Christian Addeo, Pordenone (IT); Vincenzo Sestito, Milan (IT); Italo Busi, Milan (IT)

(73) Assignee: Alcatel Lucent, Paris (FR)

(*) Notice: Subject to any disclaimer, the term of this patent is extended or adjusted under 35 U.S.C. 154(b) by 418 days.

(21) Appl. No.: 11/831,500

(22) Filed: Jul. 31, 2007

(65) Prior Publication Data
US 2008/0031261 A1 Feb. 7, 2008

(30) Foreign Application Priority Data

Aug. 1, 2006 (EP) .................................. 06291247

(51) Int. Cl.
*H04L 12/28* (2006.01)
(52) U.S. Cl. .......................................... 370/392; 370/401
(58) Field of Classification Search .................... None
See application file for complete search history.

(56) References Cited

U.S. PATENT DOCUMENTS

| 5,898,827 | A * | 4/1999 | Hornung et al. .............. 714/11 |
| 6,545,981 | B1 * | 4/2003 | Garcia et al. ................. 370/242 |
| 7,551,559 | B1 * | 6/2009 | Jonnala et al. ............... 370/230 |
| 2004/0103282 | A1 * | 5/2004 | Meier et al. ................... 713/171 |
| 2004/0210670 | A1 * | 10/2004 | Anerousis et al. ............ 709/238 |
| 2006/0002311 | A1 * | 1/2006 | Iwanaga et al. ............... 370/254 |
| 2006/0002370 | A1 | 1/2006 | Rabie et al. |
| 2006/0013142 | A1 * | 1/2006 | Hongal et al. ................. 370/248 |
| 2006/0146835 | A1 | 7/2006 | Homchaudhuri et al. |
| 2006/0245436 | A1 * | 11/2006 | Sajassi ....................... 370/395.53 |
| 2006/0248229 | A1 * | 11/2006 | Saunderson et al. .......... 709/245 |
| 2007/0097998 | A1 * | 5/2007 | Raikar .......................... 370/409 |
| 2007/0115913 | A1 * | 5/2007 | Li et al. ........................ 370/349 |
| 2007/0258382 | A1 * | 11/2007 | Foll et al. ..................... 370/252 |
| 2007/0263535 | A1 * | 11/2007 | Shabtay ........................ 370/230 |
| 2008/0170550 | A1 * | 7/2008 | Liu et al. ...................... 370/338 |

OTHER PUBLICATIONS

S. Homchaudhuri, M. Foschiano; Addressing VLAN Scalability and Security Issues in a Multi-Client Enviornment; Internet Engineering Task Force; The Internet Soc Feb. '06, 15pgs.

* cited by examiner

*Primary Examiner* — Hassan Phillips
*Assistant Examiner* — Eunsook Choi
(74) *Attorney, Agent, or Firm* — Carmen Patti Law Group, LLC

(57) ABSTRACT

It is disclosed a method for monitoring traffic in a private VLAN, the traffic bidirectionally propagating across the private VLAN through a sequence of nodes sequentially connected by a primary VLAN and a secondary VLAN, the sequence of nodes comprising a first node and a second node, wherein the method comprises: transmitting a monitoring message from the first node to the second node either along the primary VLAN or the secondary VLAN, according to a first criterion based upon a type of the first node; receiving the monitoring message at the second node; and upon reception of the monitoring message at the second node, transmitting a reply message from the second node to the first node either along the primary VLAN or the secondary VLAN, according to a second criterion based upon a type of the second node and upon a VLAN different from the VLAN from which the monitoring message has been received.

22 Claims, 7 Drawing Sheets

METHOD AND NETWORK NODE FOR MONITORING TRAFFIC IN A PRIVATE VLAN

FIELD OF THE INVENTION

The present invention relates to the field of access and/or aggregation networks. In particular, the present invention relates to a method for monitoring traffic in a private VLAN, and to a network node of a VLAN for implementing such a method.

BACKGROUND OF THE INVENTION

It is known that an access and/or aggregation network is a telecommunication network allowing to provide a number of users with telephone/data services. Typically, an access and/or aggregation network has a tree-like structure, so that the number of users is connected to a node (for instance, a router) of packet-switched core network. Traffic may be transmitted either in downstream direction, i.e. from the core network node to users, or in upstream direction, i.e. from a user to the core network node. Generally speaking, an access and/or aggregation network provides user segregation, i.e. users can not communicate one with the other, except in some particular cases, as it will be shown in further detail herein after.

Different technologies are known for implementing an access and/or aggregation network. Nowadays, a more and more frequent technology for implementing an access and/or aggregation network is the Ethernet technology. In particular, Ethernet technology provides implementation of a so-called "Virtual Local Area Network", or briefly VLAN. A VLAN comprises a virtual set of nodes which are not necessarily part of a same network segment, but which are able to communicate as if they were part of a same network segment. In a VLAN, broadcast traffic generated by a node of a VLAN is broadcasted to all the other nodes belonging to the same VLAN. Further, as connections between nodes of a VLAN are Ethernet-based, they are bi-directional, i.e. they are able to support traffic in either direction.

An advantageous implementation of an Ethernet-based access and/or aggregation network is a so-called private VLAN. A private VLAN typically comprises the superimposition of a first VLAN, which is named primary VLAN, and at least a second VLAN, which is named secondary VLAN. The primary VLAN is adapted to transport downstream traffic. The secondary VLAN may be adapted to transport only upstream traffic; in this case, the secondary VLAN is an "isolated" secondary VLAN. Besides, as already mentioned, some particular services may require bi-directional communication between users. In this case, a secondary VLAN may be adapted to transport also bi-directional traffic between users belonging to a same community enjoying such services; is this case, the secondary VLAN is a "community" secondary VLAN. A private VLAN may comprise any number of secondary VLANs, with at most one secondary VLAN being an isolated VLAN.

Therefore, logically adjacent nodes of a same private VLAN are logically connected by a number of parallel bi-directional connections which is equal to the overall number of VLANs (both primary and secondary) comprised in the private VLAN.

Traffic direction of each VLAN and user segregation are implemented by suitably configuring interfaces between private VLAN and core network and interfaces between private VLAN and users. More particularly, three types of interfaces are provided, according to their configuration:

promiscuous interface: it is adapted to transmit traffic along the primary VLAN. Further, it is adapted to receive traffic from any other interface of the same private VLAN;

isolated interface: it is adapted to transmit traffic along the isolated VLAN. Further, it is adapted to receive traffic from promiscuous interfaces of the same private VLAN; and community interface: it is adapted to transmit traffic along a community VLAN. Further, it is adapted to receive traffic both from promiscuous interface of the same private VLAN and from community interfaces of the same community VLAN.

Typically, a private VLAN comprises a single promiscuous interface and a plurality of isolated or community interfaces. The promiscuous interface is adapted to interface the private VLAN with the core network node. Each isolated interface is adapted to interface the private VLAN with a user which is not subscribing any service requiring bi-directional communication between users. Each community interface is adapted to interface the private VLAN with a user which is subscribing a service requiring bi-directional communication between users.

When a service is provided by means of a private VLAN network, the service provider may be interested in monitoring traffic exchanged either between a user and the core network, or between two users.

The Ethernet technology provides a set of functions which is called OAM ("Operation, Administration and Management") allowing to monitor a bi-directional connection. Implementation of such OAM functions is performed by transmitting particular messages, which are called OAM messages, along the connection to be monitored. Different types of OAM messages are provided, each type performing a different OAM function. OAM messages are typically formatted as Ethernet packets.

For instance, it is assumed to perform OAM monitoring of a point-to-point Ethernet connection comprising two end nodes and at least an intermediate node. For starting OAM monitoring, a first end node of the connection periodically transmits an OAM message along the connection. The OAM message passes through the intermediate node(s) and it is received by the second end node. In case the OAM message requires an OAM reply, the second end node, upon reception of the OAM message, transmits an OAM reply to the first node along the same connection. Then, the OAM reply is received by the first end node. Therefore, by processing the OAM message and the OAM reply, the first end node is capable of monitoring the connection in both traffic directions.

SUMMARY OF THE INVENTION

The Applicant has perceived that the above described mechanism for monitoring a point-to-point Ethernet connection by means of OAM messages/replies is not suitable for monitoring traffic in a private VLAN.

In fact, the above described mechanism allows to monitor traffic which travels along both directions of a same connection, since both the OAM message and the OAM reply travel along the same connection. However, as mentioned above, in a private VLAN traffic exchanged between a user and a core network is transported along the primary VLAN in the downstream direction, and along the secondary isolated VLAN in the upstream direction. Therefore, transmitting an OAM message along a connection of a given VLAN and receiving an OAM reply along the same connection does not allow to monitor traffic both in upstream and in downstream direction.

Therefore, an object of the present invention is providing a method for monitoring traffic in a private VLAN which overcomes the aforesaid problem.

In particular, an object of the present invention is providing a method for monitoring traffic in a private VLAN which allows to monitor traffic in both directions, independently of the fact that traffic in opposite directions travels along a same VLAN or along different VLANs of a same private VLAN.

According to a first aspect, the present invention provides a method for monitoring traffic in a private VLAN, the traffic bidirectionally propagating across the private VLAN through a sequence of nodes sequentially connected by a primary VLAN and a secondary VLAN. The sequence of nodes comprising a first node and a second node, wherein the method comprises: transmitting a monitoring message from the first node to the second node either along the primary VLAN or the secondary VLAN, according to a first criterion based upon a type of the first node; receiving the monitoring message at the second node; and upon reception of the monitoring message at the second node, transmitting a reply message from the second node to the first node either along the primary VLAN or the secondary VLAN, according to a second criterion based upon a type of the second node and upon a VLAN different from the VLAN from which the monitoring message has been received.

When the first node is of a promiscuous interface type, the first criterion may provide that the monitoring message has to be transmitted along the primary VLAN.

When the first node is of an isolated interface type, the first criterion may provide that the monitoring message has to be transmitted along the secondary VLAN, the secondary VLAN being an isolated VLAN.

When the first node is of a community interface type, the first criterion may provide that the monitoring message has to be transmitted along the secondary, the secondary VLAN being a community VLAN.

The second node may be an end node of the sequence of nodes or an intermediate node of the sequence of nodes.

The second node may be of a promiscuous interface type, and the second criterion may provide that: in case the monitoring message is received along the secondary VLAN, the secondary VLAN being an isolated VLAN, the reply message has to be transmitted along the primary VLAN; and in case the monitoring message is received along the secondary VLAN, the secondary VLAN being a community VLAN, the reply message has to be transmitted along the secondary VLAN.

The second node may be of an isolated interface type, and the second criterion may provide that: in case the monitoring message is received along the primary VLAN, the reply message has to be transmitted along the secondary VLAN, the secondary VLAN being an isolated VLAN.

The second node may be of a community interface type, and the second criterion may provide that in case the monitoring message is received along the secondary VLAN, the secondary VLAN being a community VLAN, the reply message has to be transmitted along the secondary VLAN.

The second node may be of an interswitch type, and the second criterion may provide that: in case the monitoring message is received along the primary VLAN, the reply message has to be transmitted along the secondary VLAN, the secondary VLAN being an isolated VLAN; in case the monitoring message is received along the secondary VLAN, the secondary VLAN being an isolated VLAN, the reply message has to be transmitted along the primary VLAN; and in case the monitoring message is received along the secondary VLAN, the secondary VLAN being a community VLAN, the reply message has to be transmitted along the secondary VLAN.

The second node may be further adapted to forward the monitoring message and/or the reply message along the same VLAN along which the monitoring message and/or the reply message has been received at the second node.

The monitoring message may be an Operation Administration Management—OAM—message.

The second criterion may be included into a type length value TLV field of the monitoring message.

According to a second aspect, the present invention provides a first node of a private VLAN comprising a primary VLAN and a secondary VLAN, the node being comprised in a sequence of nodes supporting traffic bidirectionally propagating across the private VLAN, wherein the node comprises a port which is adapted to transmit a monitoring message for monitoring the traffic, either along the primary VLAN or the secondary VLAN, according to a first pre-defined criterion based upon the type of the node; the port is further adapted to receive a reply message according to a second pre-defined criterion based upon a type of a second node of the sequence and upon the VLAN from which the monitoring message has been transmitted.

The first node may be of a promiscuous interface type, and the first criterion may provide that the monitoring message has to be transmitted along the primary VLAN.

The first node may be of an isolated interface type, and the first criterion may provide that the monitoring message has to be transmitted along the secondary VLAN, the secondary VLAN being an isolated VLAN.

The first node may be of a community interface type, and the first criterion may provide that the monitoring message has to be transmitted along the secondary VLAN, the secondary VLAN being a community VLAN.

According to a third aspect, the present invention provides a second node of a private VLAN comprising a primary VLAN and a secondary VLAN, the second node being comprised in a sequence of nodes supporting traffic bidirectionally propagating across the private VLAN, wherein the node may comprise a port which is adapted to, upon reception of a monitoring message for monitoring the traffic, transmit a reply message either along the primary VLAN or the secondary VLAN, according to a second pre-defined criterion based upon a type of the node and upon the VLAN from which the monitoring message has been received.

The second node may be of a promiscuous interface type and the second criterion may provide that: in case the monitoring message is received along the secondary VLAN, the secondary VLAN being an isolated VLAN, the reply message has to be transmitted along the primary VLAN; and in case the monitoring message is received along the secondary VLAN, the secondary VLAN being a community VLAN, the reply message has to be transmitted along the secondary VLAN.

The second node may be of an isolated interface type and the second criterion may provide that: in case the monitoring message is received along the primary VLAN, the reply message has to be transmitted along the secondary VLAN, the secondary VLAN being an isolated VLAN.

The second node may be of a community interface type and the second criterion may provide that in case the monitoring message is received along the secondary VLAN, the secondary VLAN being a community VLAN, the reply message has to be transmitted along the secondary VLAN.

The second node may be of an interswitch type and the second criterion may provide that in case the monitoring message is received along the primary VLAN, the reply message has to be transmitted along the secondary VLAN, the secondary VLAN being an isolated VLAN; in case the monitoring message is received along the secondary VLAN, the secondary VLAN being an isolated VLAN, the reply message has to be transmitted along the primary VLAN; and in case the monitoring message is received along the secondary VLAN, the secondary VLAN being a community VLAN, the reply message has to be transmitted along the secondary VLAN.

According to a fourth aspect, the present invention provides a first node of a private VLAN comprising a primary VLAN and a secondary VLAN, the first node being comprised in a sequence of nodes supporting traffic bidirectionally propagating across the private VLAN, wherein the first node comprises means adapted to transmit a monitoring message for monitoring the traffic, either along the primary VLAN or the secondary VLAN; the means are further adapted to receive a reply message along a VLAN different from the VLAN along which the monitoring message has been transmitted. The transmitted monitoring message preferably includes a field indicating the different VLAN (either the primary VLAN or the secondary VLAN) along which the reply message is received by the first node.

According to a fifth aspect, the present invention provides a second node of a private VLAN comprising a primary VLAN and a secondary VLAN, the second node being comprised in a sequence of nodes supporting traffic bidirectionally propagating across the private VLAN, wherein the second node comprises means adapted to, upon reception along the primary VLAN or the secondary VLAN of a monitoring message for monitoring the traffic, transmit a reply message along a VLAN different from the VLAN from which the monitoring message has been received. The received monitoring message preferably includes a field indicating to said second node the different VLAN (either the primary VLAN or the secondary VLAN) along which the reply message is transmitted by the second node.

According to a sixth aspect, the present invention provides a private virtual local area network comprising a first node as set forth above and a second node as set forth above.

BRIEF DESCRIPTION OF THE DRAWINGS

The present invention will become more clear by reading the following detailed description, given by way of example and not of limitation, to be read by referring to the accompanying drawings, wherein.

BEST MODE FOR CARRYING OUT THE INVENTION

Figure 1:
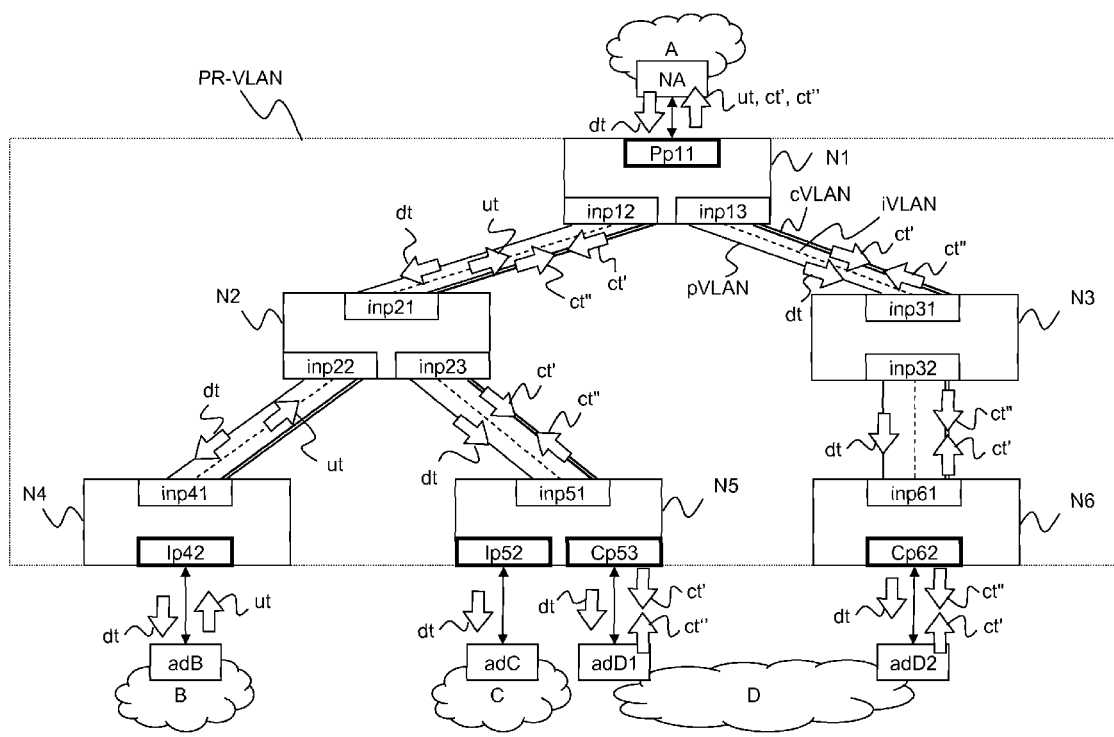
FIG. 1 schematically shows an exemplary private VLAN, which is adapted to perform the method according to an embodiment of the present invention.

FIG. 1 schematically shows an exemplary private VLAN PR-VLAN. The network PR-VLAN is adapted to connect three users B, C and D to a node NA of a packet-switched core network A. This is only exemplary, since a private VLAN is able to connect an arbitrary number of users to a core network node.

The core network A may be for instance an IP network. In such a case, the core network node NA may be a router.

Users B and C are connected to the network PR-VLAN by means of respective access devices adB, adC, while the user D is connected to the network PR-VLAN by means of two different access devices adD1, adD2.

The network PR-VLAN comprises six nodes N1, N2, N3, N4, N5, N6. Such number of nodes is of course exemplary. The nodes N1, N2, N3, N4, N5, N6 are arranged according to a tree-like structure. As already mentioned, such a structure is logical and not physical, i.e. the structure is not due to physical disposition of nodes, but to operation of VLANs composing the private VLAN PR-VLAN.

The node N1 is provided with a first port Pp11, a second port inp12 and a third port inp13.

The first port Pp11 is connected to the core network node NA, i.e. it acts as an interface between the network PR-VLAN and the core network A (in particular, its node NA). In the following description and in the claims, the expression "interface port" will designate a node port which is adapted to act as an interface between the private VLAN and a network device external to the private VLAN, such as the core network node NA or the access devices adB, adC, adD1 and adD2. In the following description and in the claims, a node comprising an interface port (such as the nodes N1, N4, N5 or N6 in FIG. 1) will be termed "interface node". Preferably, the interface port Pp11 is a promiscuous interface, as defined in the introduction to the present description.

The second port inp2 and the third port inp3 are interswitch ports, i.e. they connect the interface node N1 to other nodes of the network PR-VLAN. In the following description and in the claims, the expression "interswitch port" will designate a node port which is adapted to connect the node to another node of the same private VLAN. In the following description and in the claims, a node comprising only interswitch ports (such as nodes N2 and N3) will be termed "interswitch node".

The node N2 comprises a first interswitch port inp21, a second interswitch port inp22 and a third interswitch port inp23. The node N3 comprises a first interswitch port inp31 and a second interswitch port inp32. The interswitch port inp12 of the node N1 is connected to the interswitch port inp21 of the node N2. Similarly, the interswitch port inp13 of the node N1 is connected to the first interswitch port inp31 of the node N3.

The node N4 comprises an interswitch port inp41 and an interface port p42. The node N5 comprises an interswitch port inp51, a first interface port Ip52 and a second interface port Cp53. The interswitch port inp22 of the node N2 is connected to the interswitch port inp41 of the node N4. Similarly, the interswitch port inp23 of the node N2 is connected to the interswitch port inp51 of the node N5.

The node N6 comprises an interswitch port inp61 and an interface port Cp62. The interswitch port inp32 of the node N3 is connected to the interswitch port inp61 of the node N6.

The interface port Ip42 of the node N4 is connected to the access device adB of the user B. Preferably, the interface port Ip42 is an isolated interface, as defined above. The first interface port Ip52 of the node N5 is connected to the access device adC of the user C. Preferably, the interface port Ip52 is an isolated interface, as defined above. The second interface port Cp53 of the node N5 is connected to the first access device adD1 of the user D. Preferably, the interface port Cp53 is a community interface, as defined above. The interface port Cp62 of the node N6 is connected to the second access device adD2 of the user D. Preferably, the interface port Cp62 is a community interface, as defined above.

Therefore, four types of nodes can be identified in the network PR-VLAN:
- promiscuous interface type: it comprises interface nodes with at least a promiscuous interface port, such as N1;
- isolated interface type: it comprises interface nodes with at least an isolated interface port, such as N4 and N5;
- community interface type: it comprises interface nodes with at least a community interface port, such as N5 and N6; and
- interswitch type: it comprises interswitch nodes.

Interface nodes comprising both isolated interface ports and community interface ports (such as N5) belongs both to the isolated interface type and to the community interface type.

The nodes N1, N2, N3, N4, N5, N6 are connected one with the other according to the above described arrangement by means of a primary VLAN pVLAN (indicated by a continuous line in FIG. 1) and two secondary VLANs. The first secondary VLAN is an isolated VLAN iVLAN and it is indicated by a dashed line in FIG. 1. The second secondary VLAN is a community VLAN cVLAN and it is indicated by a double line in FIG. 1. This is only exemplary, since a private VLAN may comprise any number $n \geq 1$ of secondary VLANs, wherein at most one VLAN is an isolated VLAN.

Therefore, logically adjacent nodes of the network PR-VLAN of FIG. 1 are connected by means of three parallel connections.

Each network pVLAN, iVLAN and cVLAN of FIG. 1 is intrinsically bi-directional. However, as already explained, the interfaces of the network PR-VLAN (i.e. the interface ports of interfaces nodes N1, N4, N5, N6) are configured so that the network pVLAN transports downstream traffic, the network iVLAN transports upstream traffic, and the network cVLAN transports both bi-directional traffic among a community of users and upstream traffic.

In particular, FIG. 1 shows that the network A (in particular, the node NA of the network A) is capable of transmitting downstream traffic dt to all the users B, C and D by means of the promiscuous interface port Pp11 of the interface node N1, which then forwards the downstream traffic dt along all branches of the network pVLAN. Each interface port Ip42, Ip52, Cp53, Cp62 receive the downstream traffic dt along the network pVLAN and forwards it to the respective access device adB, adC, adD1, adD2.

Further, FIG. 1 shows that a user (for instance, the user B) is capable of transmitting upstream traffic ut to the network A by means of the isolated interface port Ip42 of the interface node N4, which then forwards the upstream traffic ut along the network iVLAN. The interface ports Ip52, Cp53, Cp62, upon reception of the traffic ut along the network iVLAN, discard it and do not forward it (not shown in FIG. 1). On the contrary, the promiscuous interface port Pp11 receives the traffic ut along the network iVLAN and forwards it to the core network node NA. The above consideration also apply to users C and D, irrespective of the fact they are connected to the private VLAN by means of an isolated interface or a community interface.

Finally, FIG. 1 shows that the access device adD2 of the user D is capable of transmitting traffic ct' to the access device adD1 by means of the community interface port Cp62 of the interface node N6, which then forwards it along the network cVLAN. The isolated interface ports Ip42, Ip52, upon reception of the traffic ct' along the network cVLAN, discard it and do not forward it. On the contrary, the community interface port Cp53 receives the traffic ct' along the network cVLAN and forwards it to the access device adD1. Similarly, the promiscuous interface port Pp11 receives the traffic ct' along the network cVLAN and forwards it to the network node NA. The same considerations apply also to the traffic ct" transmitted by the first access device adD1 to the second access device adD2 along the network cVLAN.

Now, it is assumed that the network provider of a private VLAN similar to the network PR-VLAN of FIG. 1 whishes to monitor traffic associated to a given service provided by means of the private VLAN.

Typically, the traffic to be monitored passes through the private VLAN by following a sequence of logically adjacent nodes of the private VLAN in both senses of propagation. Typically, the two end nodes of the sequence are interface nodes, whilst possible intermediate nodes of the sequence may be either interswitch nodes or interface nodes of the private VLAN. By referring to FIG. 1, an exemplary sequence may be N4-N2-N1, which is followed by the upstream and downstream traffic ut, dt exchanged between NA and B. A further exemplary sequence may be N6-N3-N1-N2-N5, which is followed by the bi-directional traffic ct', ct" exchanged between adD1 and adD2. Logically adjacent nodes of a sequence are sequentially connected by the VLANs composing the private VLAN.

According to embodiments of the present invention, a monitoring message is transmitted along the sequence of nodes by a first end node of the sequence, along a given VLAN of the private VLAN. Preferably, the VLAN along which the monitoring message is transmitted by the first end node (which, as already mentioned, is an interface node of the private VLAN) is the same VLAN along which the first end node forwards traffic received from network devices external to the private VLAN, as shown in FIGS. 2a, 2b and 2c.

Figure 2A:
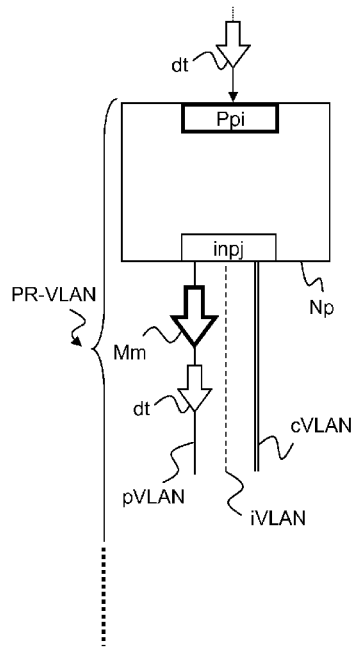
FIGS. 2a, 2b, 2c schematically show an interface node of promiscuous interface type, of isolated interface type and of community interface type respectively, and respective criteria adopted by such interface nodes for transmitting a monitoring message.

In particular, FIG. 2a shows an interface node Np of the promiscuous interface type, comprising a promiscuous interface port Ppi and an interswitch port inpj which is connected to a further node of the network PR-VLAN (not shown in FIG. 2a) by means of a primary VLAN pVLAN (continuous line), an isolated secondary VLAN iVLAN (dashed line) and a community secondary VLAN cVLAN (double line). As shown in FIG. 2a, the promiscuous interface port Ppi receives downstream traffic dt from outside the network PR-VLAN, and it forwards it along the primary network pVLAN. Therefore, for an interface node of the promiscuous interface type (i.e. for its promiscuous interface port), the VLAN along which the monitoring message (indicated as Mm in FIG. 2a) has to be transmitted is the primary VLAN pVLAN.

Figure 2B:
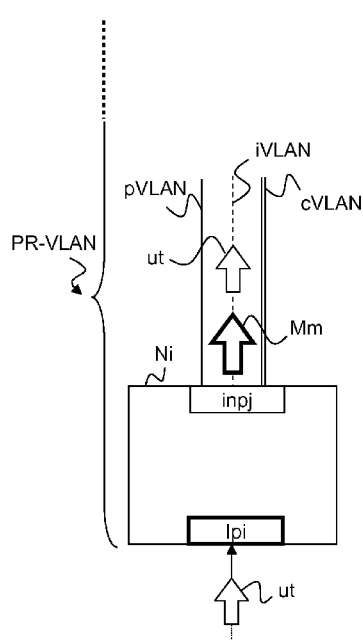

Similarly, FIG. 2b shows an interface node Ni of the isolated interface type, comprising an isolated interface port Ipi and an interswitch port inpj which is connected to a further node of the network PR-VLAN (not shown in FIG. 2b) by means of a primary VLAN pVLAN (continuous line), an isolated secondary VLAN iVLAN (dashed line) and a community secondary VLAN cVLAN (double line). As shown in FIG. 2b, the isolated interface port Ipi receives upstream traffic ut from outside the network PR-VLAN, and it forwards it along the isolated network iVLAN. Therefore, for an interface node of the isolated interface type (i.e. for its isolated interface port), the VLAN along which the monitoring message (indicated as Mm in FIG. 2b) has to be transmitted is the isolated secondary VLAN iVLAN.

Figure 2C:
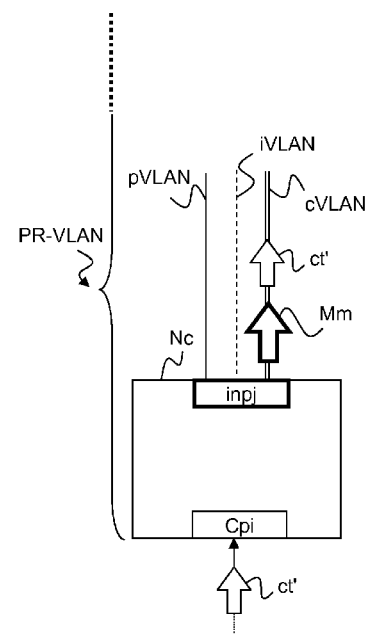

Similarly, FIG. 2c shows an interface node Nc of the community interface type, comprising a community interface port Cpi and an interswitch port inpj which is connected to a further node of the network PR-VLAN (not shown in FIG. 2c) by means of a primary VLAN pVLAN (continuous line), an isolated secondary VLAN iVLAN (dashed line) and a community secondary VLAN cVLAN (double line). As shown in FIG. 2c, the community interface port Cpi receives traffic ct' from outside the network PR-VLAN, and it forwards it along the community network cVLAN. Therefore, for an interface node of the promiscuous interface type (i.e. for its community interface port), the VLAN along which the monitoring message (indicated as Mm in FIG. 2c) has to be transmitted is the community secondary VLAN cVLAN.

According to embodiments of the present invention, the monitoring message transmitted by the first end node may require a reply message by the second end node. Therefore, when the monitoring message, after propagating along the VLAN chosen according to the above criteria, reaches the second end node, the second end node transmits a reply message to the first end node. Preferably, the VLAN along which the reply message has to be transmitted by the second end node (which, as already mentioned, is an interface node of the private VLAN) is the same VLAN along which the second end node forwards traffic following the same sequence of nodes followed by the monitoring message, but in the opposite direction, as shown in FIGS. 3a, 3b and 3c.

Figure 3A:
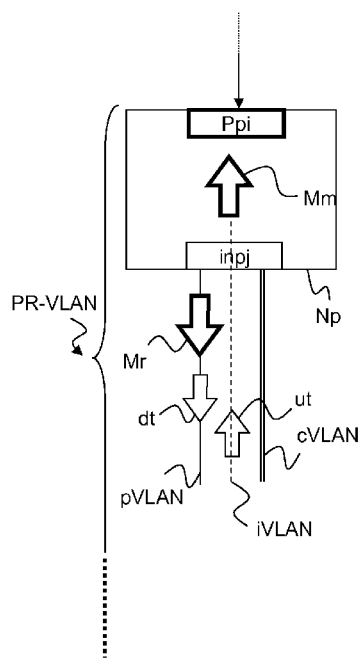
FIGS. 3a, 3b, 3c schematically show an interface node of promiscuous interface type, of isolated interface type and of community interface type, respectively, and respective criteria adopted by such interface node for transmitting a reply message to a received monitoring message.

In particular, FIG. 3a shows the interface node Np of the promiscuous interface type of FIG. 2a. As shown in FIG. 3a, the promiscuous interface port Ppi receives a monitoring message Mm along the isolated network iVLAN, for monitoring upstream traffic ut. Therefore, since downstream traffic dt is transported along the primary VLAN pVLAN, for an interface node of the promiscuous interface type (i.e. for its promiscuous interface port) receiving a monitoring message Mm along the isolated iVLAN, the VLAN along which the reply message (indicated as Mr in FIG. 3a) has to be transmitted is the primary VLAN pVLAN.

Figure 3B:
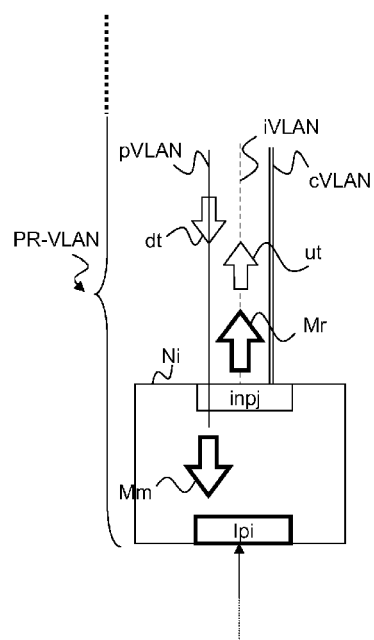

Similarly, FIG. 3b shows the interface node Ni of the isolated interface type of FIG. 2b. As shown in FIG. 3b, the isolated interface port Ipi receives a monitoring message Mm along the primary network pVLAN, for monitoring downstream traffic dt. Therefore, since upstream traffic ut is transported along the isolated secondary VLAN iVLAN, for an interface node of the isolated interface type (i.e. for its isolated interface port) receiving a monitoring message Mm along the primary VLAN, the VLAN along which the reply message (indicated as Mr in FIG. 3b) has to be transmitted is the isolated secondary VLAN iVLAN.

Figure 3C:
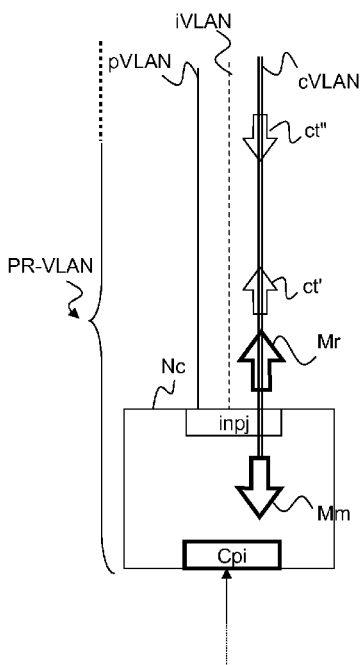

Similarly, FIG. 3c shows the interface node Nc of the community interface type of FIG. 2c. As shown in FIG. 3c, the community interface port Cpi receives a monitoring message Mm along the community network cVLAN, for monitoring traffic ct" in a first propagation direction. Therefore, since traffic ct' in the opposite direction is transported along the same community network cVLAN, for an interface node of the community interface type (i.e. for its community interface port) receiving a monitoring message Mm along the community VLAN, the VLAN along which the reply message (indicated as Mr in FIG. 3c) has to be transmitted is the same community secondary VLAN cVLAN. Further, in case the monitoring message Mm is received by the community interface port Cpi along the community VLAN, the response message Mr has to be transmitted along the community VLAN.

Figure 4A:
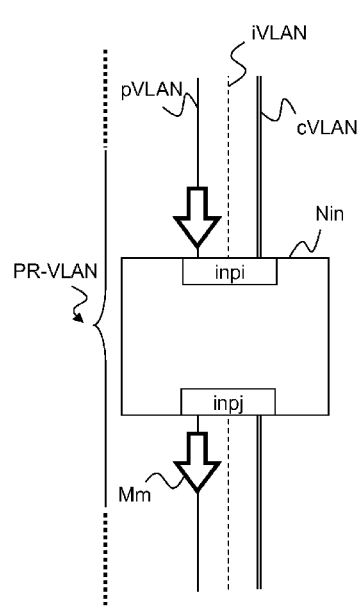
FIGS. 4a, 4b, 4c schematically show an intermediate node and criteria adopted by such intermediate node for forwarding a monitoring message received from a primary VLAN, an isolated secondary VLAN and a community secondary VLAN, respectively.
Figure 4B:
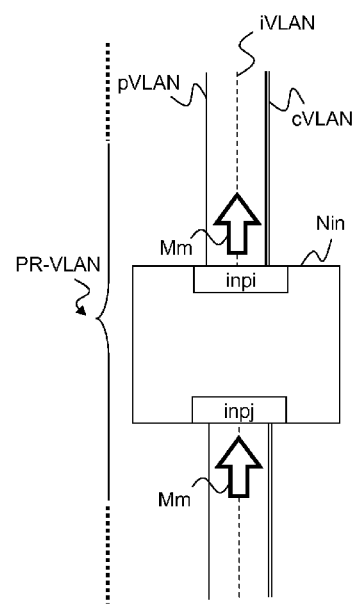
Figure 4C:
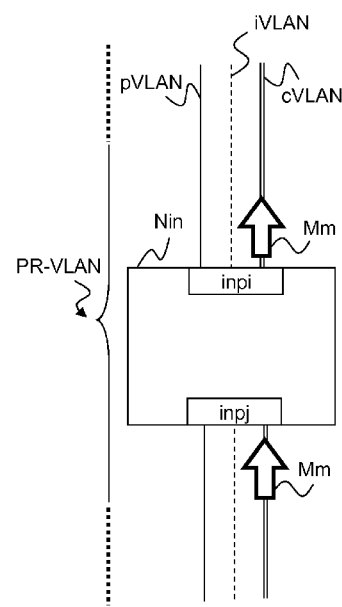

According to embodiments of the present invention, monitoring messages transmitted by the first end node to the second end node are forwarded by possible intermediate nodes of the sequence. Similarly, reply messages transmitted by the second end node to the first end node are forwarded by possible intermediate nodes of the sequence. Preferably, the VLAN along which a monitoring/reply message received at an intermediate node has to be forwarded by the intermediate node (which, as already mentioned, may be either an interface node of any type or an interswitch node of the private VLAN) is the same VLAN along which the monitoring/reply message has been received, as shown in FIGS. 4a, 4b and 4c. In other words, intermediate nodes of the sequence are transparent to monitoring/reply messages.

In particular, FIGS. 4a, 4b, 4c schematically show an intermediate node Nin, comprising a first interswitch port inpi and a second interswitch port inpj. In case the intermediate node Nin belongs to an interface type (typically the promiscuous interface type), it further comprises interface ports, which are not shown in FIGS. 4a, 4b, 4c. Each interswitch port inpi, inpj is adapted to connect the node Nin to a respective further node of the private VLAN PR-VLAN, (not shown in FIGS. 4a, 4b, 4c) by means of a primary VLAN pVLAN (continuous line), an isolated secondary VLAN iVLAN (dashed line) and a community secondary VLAN cVLAN (double line).

As shown in FIG. 4a, in case the intermediate node Nin receives a monitoring message Mm through the primary network pVLAN, it forwards the monitoring message Mm along the primary network pVLAN. Similarly, as shown in FIG. 4b, in case the intermediate node Nin receives a monitoring message Mm through the isolated network iVLAN, it forwards the monitoring message Mm along the isolated network iVLAN. Similarly, as shown in FIG. 4c, in case the intermediate node Nin receives a monitoring message Mm through the community network cVLAN (in either direction), it forwards the monitoring message Mm along the community network cVLAN in the same direction. The same above considerations also apply to reply messages.

According to embodiments of the present invention, the monitoring message transmitted by the first end node may require a reply message by possible intermediate nodes. Therefore, when the monitoring message, after being transmitted along the VLAN chosen according to the above criteria, reaches an intermediate node, the intermediate node transmits a reply message to the first end node. Preferably, the VLAN along which the reply message has to be transmitted by the intermediate node (which, as already mentioned, may be either an interface node of any type or an interswitch node of the private VLAN) is the same VLAN along which the intermediate node forwards traffic following the same sequence of nodes followed by the monitoring message, but in the opposite direction, as shown in FIGS. 5a, 5b and 5c.

Figure 5A:
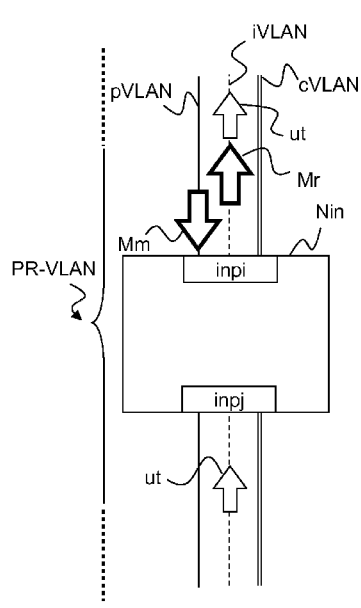
FIGS. 5a, 5b, 5c schematically show an intermediate node and criteria adopted by such intermediate node for transmitting a reply message to a monitoring message received from a primary VLAN, an isolated secondary VLAN and a community secondary VLAN, respectively.
Figure 5B:
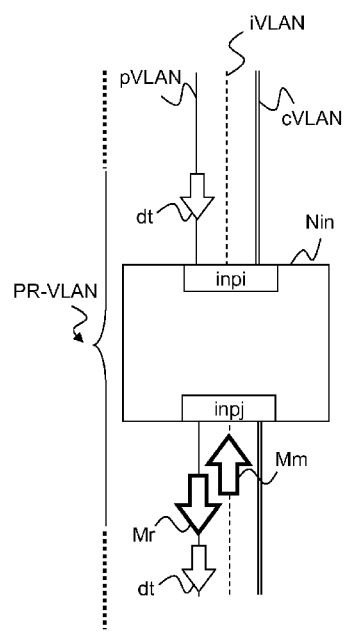
Figure 5C:
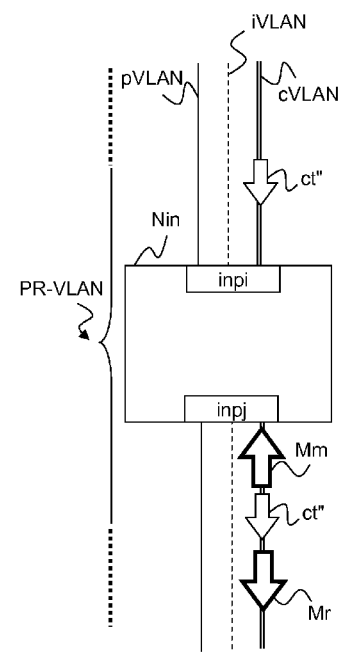

FIGS. 5a, 5b, 5c show the same interface node Nin of FIGS. 4a, 4b, 4c.

As shown in FIG. 5a, the intermediate node Nin receives a monitoring message Mm along the primary network pVLAN, for monitoring downstream traffic. Therefore, since upstream traffic ut is transported along the isolated secondary VLAN iVLAN, for an intermediate node receiving a monitoring message Mm along the primary VLAN, the VLAN along which the reply message (indicated as Mr in FIG. 5a) has to be transmitted is the isolated secondary VLAN iVLAN.

Similarly, as shown in FIG. 5b, the intermediate node Nin receives a monitoring message Mm along the isolated network iVLAN, for monitoring upstream traffic. Therefore, since downstream traffic dt is transported along the primary VLAN pVLAN, for an intermediate node receiving a monitoring message Mm along the isolated secondary VLAN, the VLAN along which the reply message (indicated as Mr in FIG. 5b) has to be transmitted is the primary VLAN pVLAN.

Similarly, as shown in FIG. 5c, the intermediate node Nin receives a monitoring message Mm along the community network cVLAN, for monitoring traffic in a first propagation direction. Therefore, since traffic ct" in the opposite direction is transported along the same community network cVLAN, for an intermediate node receiving a monitoring message Mm along the community VLAN, the VLAN along which the reply message (indicated as Mr in FIG. 5c) has to be transmitted is the same community secondary VLAN cVLAN.

Figure 6:
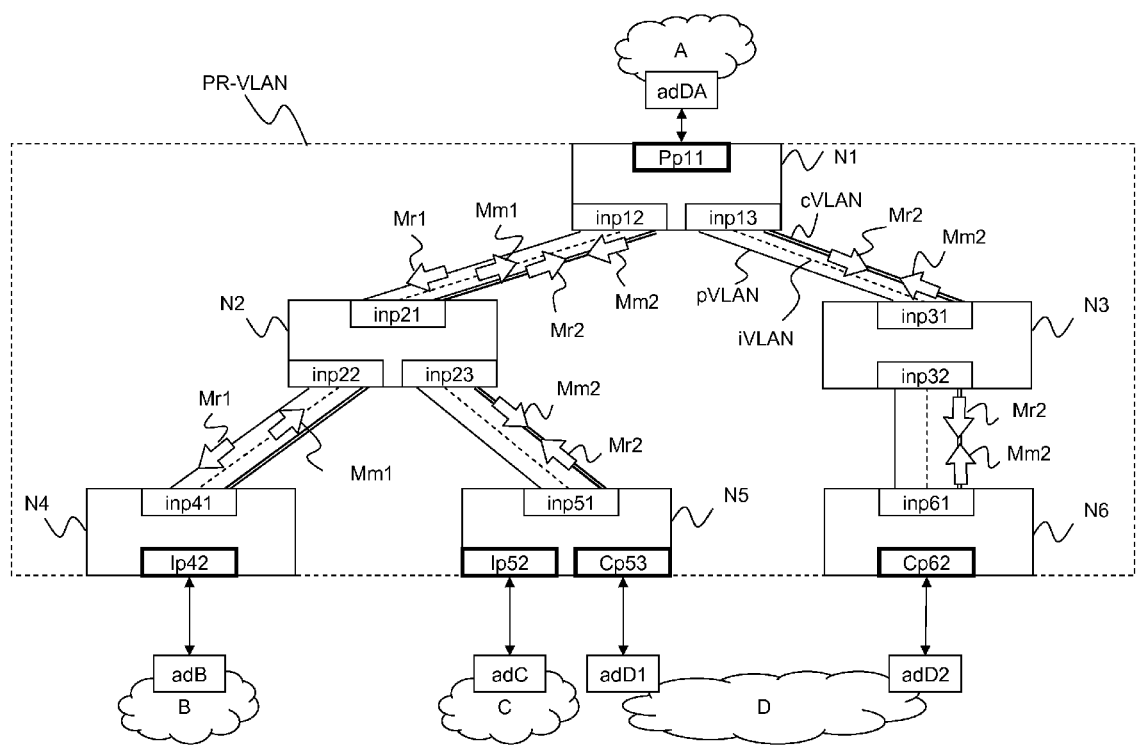
FIG. 6 schematically shows an embodiment of the method of the invention applied to the private VLAN of FIG. 1.

FIG. 6 schematically shows an embodiment of the method of the invention applied to the private VLAN of FIG. 1, in two cases. In a first case, the network provider wishes to monitor traffic exchanged between the core network A and the user B. In a second case, the network provider wishes to monitor traffic exchanged between the access devices adD1 and adD2 of the user D.

In the first case, the traffic passes through the private VLAN by following the sequence of nodes N1-N2-N4, both in upstream direction and in downstream direction. For instance, it is assumed that monitoring procedure is started by the interface node N4. In this case, the interface node N4 operates like the node Ni of FIG. 2b, i.e. the node N4 transmits a monitoring message Mm1 to the interswitch node N2 along the isolated secondary VLAN iVLAN. Upon reception of the monitoring message Mm1, the interswitch node N2 operates like the node Nin of FIG. 4b, i.e. it simply forwards the monitoring message Mm1 to the interface node N1 along the isolated secondary VLAN iVLAN. Upon reception of the monitoring message Mm1, the interface node N1 operates like the node Np of FIG. 3a, i.e. it transmits a reply message Mr1 to the interswitch node N2 along the primary VLAN pVLAN. Upon reception of the reply message Mr1, the interswitch node N2 operates like the node Nin of FIG. 4a, i.e. it simply forwards the reply message Mr1 to the interface node N4 along the primary VLAN pVLAN. Then, the interface node N4 receives the reply message Mr1 along the primary VLAN pVLAN.

Therefore, advantageously, by correlating the transmitted monitoring message Mm1 and the received reply message Mr1, the interface node N4 is capable of monitoring traffic exchanged by the network A and the user B in the private VLAN in both directions of the traffic.

In the second case, the traffic passes through the private VLAN by bi-directionally following the sequence of nodes N6-N3-N1-N2-N5. For instance, it is assumed that monitoring procedure is started by the interface node N6. In this case, the interface node N6 operates like the node Ni of FIG. 2c, i.e. the node N6 transmits a monitoring message Mm2 to the interswitch node N3 along the community secondary VLAN cVLAN. Upon reception of the monitoring message Mm2, the interswitch node N3 (and then N1 and N2) operates like the node Nin of FIG. 4c, i.e. it simply forwards the monitoring message Mm2 to the next node in the sequence along the community secondary VLAN cVLAN, until the interface node N5 receives the monitoring message Mm2 along the community network cVLAN. Upon reception of the monitoring message Mm2, the interface node N5 operates like the node Nc of FIG. 3c, i.e. it transmits a reply message Mr2 to the interswitch node N2 along the community VLAN cVLAN.

Then, as described above, the reply message Mr2 is forwarded along the community network cVLAN, until the interface node N6 receives the reply message Mr2 along the community network cVLAN.

Therefore, advantageously, by correlating the transmitted monitoring message Mm2 and the received reply message Mr2, the interface node N6 is capable of monitoring traffic exchanged by access devices adD1 and adD2 in the private VLAN in both directions of the traffic.

In case of an interface node, the above explained criteria for selecting the VLAN along which a monitoring message is to be transmitted by the interface node and the above explained criteria for selecting the VLAN along which the reply message has to be transmitted by the interface node are preferably implemented as additional configuration information of the interface ports. This is particularly advantageous, since such criteria for managing monitoring messages and reply messages are substantially analogous to configuration information of interface ports, which define the VLAN along which an interface port can transmit traffic and the interface types (promiscuous, isolated or community) from which a port can receive traffic.

On the other hand, in case of interswitch nodes, the above explained criteria for selecting the VLAN along which a monitoring/reply message received at an intermediate node has to be forwarded by the interswitch node preferably do not require any particular additional configuration information, since intermediate ports are substantially transparent to monitoring/reply messages, independently of the type of port which transmitted such monitoring/reply messages (and therefore of the VLAN along which such monitoring/reply messages are received).

On the contrary, according to advantageous embodiments of the present invention, in case of an interswitch node, the above explained criteria for selecting the VLAN along which the reply message has to be transmitted by the interswitch node are comprised into the monitoring message itself.

Figure 7:
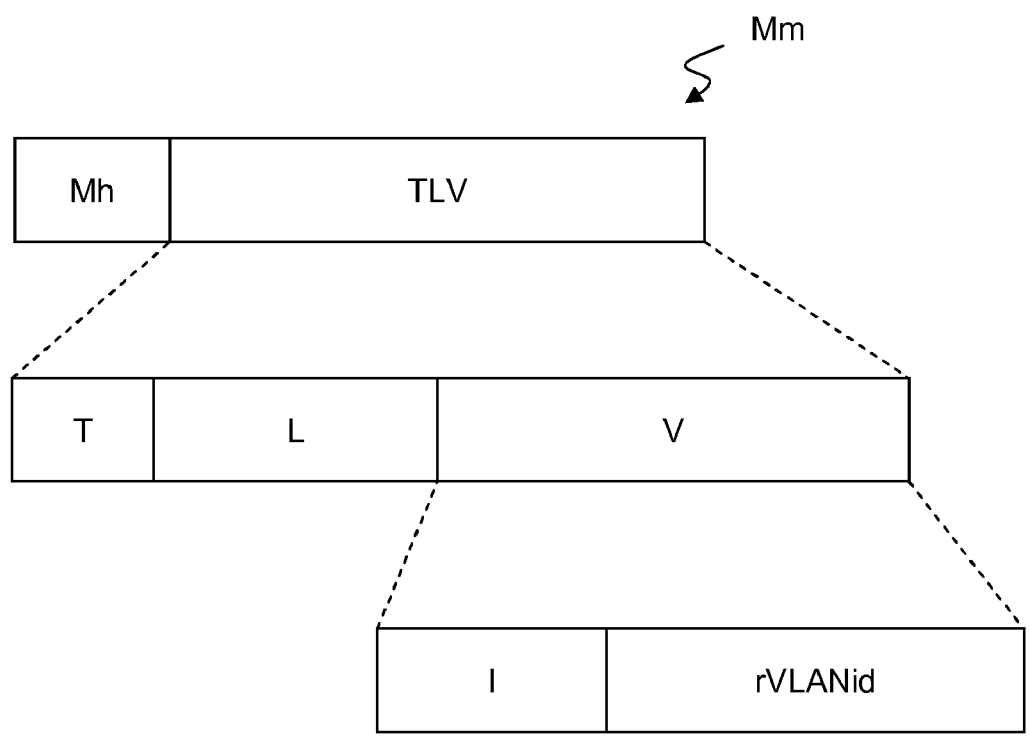
FIG. 7 schematically shows a monitoring message according to an embodiment of the present invention.

FIG. 7 shows an exemplary monitoring message Mm according to such advantageous embodiments of the present invention. The exemplary monitoring message Mm of FIG. 7 is an OAM message, comprising a header Mh and a payload. The payload of the OAM message may comprise one or more fields which are called TLVs (Type-Length-Value). Preferably, according to embodiments of the present invention, the monitoring message Mm comprises a single TLV field.

Typically, a TLV field may comprise three sub-fields:
sub-field Type (indicated as T in FIG. 7) may be equal to a predefined set of values, each value corresponding to a different type of OAM message. According to embodiments of the present invention, the sub-field T comprises a dedicated value, which is different from the values of the predefined set, such as for instance the value 250. This dedicated value indicates VLAN OAM messages, i.e. OAM messages which has to be handled by each node of a private VLAN according to criteria described above;
sub-field Length (indicated as L in FIG. 7) indicates the length of the next sub-field, expressed in bytes; and
the sub-field Value (indicated as V in FIG. 7) comprises a value transported by the OAM message. According to advantageous embodiments of the present invention, the sub-field V preferably comprises two separate sections. A first section preferably comprises an integer value I, indicating the content of the second section. For instance, in case the integer value I is equal to 1, this preferably indicates that the second section (rVLANid) comprises a VLAN identifier rVLANid identifying the VLAN along which a reply message to the monitoring message Mm has to be transmitted. Optionally, the sub-field V may also comprise a third section (not shown in FIG. 7) including an identifier of the network operator.

As an alternative, the TLV can be coded as already standard defined Organization-Specific TLV. According to this alternative, the TLV may comprise a sub-field Type (as T of FIG. 7) preferably equal to 31, a sub-field Length (as L of FIG. 7) and a sub-field Value comprising a value transported by the OAM message. The sub-field Value preferably comprises a sub-field OUI, a sub-field sub-Type and a sub-field rVLANid. OUI, as it is known, is the abbreviation of Organizationally Unique Identifier and it is provided by IEEE Registration Authority; the OUI value assigned to the italian subsidiary company of the Applicant is 00-20-60 (base 16). The sub-Type value indicates the content of the rVLANid sub-field; for instance, in case the sub-Type value is equal to 1, this preferably indicates that the rVLANid sub-field comprises a VLAN identifier identifying the VLAN along which a reply message to the monitoring message Mm has to be transmitted.

Therefore, advantageously, the method of the present invention allows to monitor both user-core network traffic and user-user traffic in a private VLAN, independently of the fact that monitored traffic in opposite directions is carried by a single VLAN or by different VLANs of the private VLAN. Advantageously, such monitoring messages may be OAM messages, but criteria for transmitting OAM messages and replies to OAM messages are different from the standard ones, for adapting standard OAM messages (which intrinsically monitor bi-directional connections) to the context of a private VLAN, wherein connections are not always bi-directionally used.

In fact, such criteria are defined so that monitor messages and reply messages for monitoring traffic actually follow the same route of the traffic, even if the route comprises different VLANs.

Moreover, such criteria (in particular criteria for establishing the VLAN along which reply messages has to be transmitted) can be advantageously included into the monitoring messages themselves. Moreover, in case monitoring messages are OAM messages, the present invention provides a method for inserting such criteria into an OAM message, which is compliant with standard OAM functions, and which can be therefore implemented in already installed networks substantially without requiring modification of network apparatuses.

The invention claimed is:

1. A method for monitoring traffic in a private virtual local area Network—VLAN—, said traffic bidirectionally propagating across said private VLAN through a sequence of nodes sequentially connected by a primary VLAN and a secondary VLAN, said sequence of nodes having at least a first node and a second node, wherein said method comprises:
   transmitting a monitoring message comprising a second criterion from said first node to said second node either along said primary VLAN or said secondary VLAN, according to a first criterion based upon a type of said first node;
   receiving said monitoring message at said second node; and
   upon reception of said monitoring message at said second node, transmitting a reply message from said second node to said first node either along said primary VLAN or said secondary VLAN, according to the second criterion based upon a type of said second node and upon a VLAN different from the VLAN from which said monitoring message has been received.

2. The method according to claim 1, wherein said first node is of a promiscuous interface type, and wherein said first criterion provides that:
   said monitoring message has to be transmitted along said primary VLAN where said primary VLAN transports only downstream traffic where downstream traffic flows only from a core network to a user.

3. The method according to claim 1, wherein said first node is of an isolated interface type, and wherein said first criterion provides that:
   said monitoring message has to be transmitted along said secondary VLAN, said secondary VLAN being an isolated VLAN where the isolated VLAN transports only upstream traffic where upstream traffic flows only from a user to a core network.

4. The method according to claim 1, wherein said first node is of a community interface type, and wherein said first criterion provides that:
   said monitoring message has to be transmitted along said secondary VLAN, said secondary VLAN being a community VLAN where the community VLAN transports bi-directional traffic, where bi-directional traffic flows from a user to a core network and; from a core network to a user.

5. The method according to claim 1, wherein said second node is an end node of said sequence of nodes and where said first node comprises an interface node and said second node comprises an interface node, where an interface node comprises a port which acts as an interface between the private VLAN and a network device external to the private VLAN.

6. The method according to claim 5, wherein said second node is of a promiscuous interface type, and wherein said second criterion provides that:
   in case said monitoring message is received along said secondary VLAN, said secondary VLAN being an isolated VLAN, said reply message has to be transmitted along said primary VLAN; and
   in case said monitoring message is received along said secondary VLAN, said secondary VLAN being a community VLAN, said reply message has to be transmitted along said secondary VLAN where said primary VLAN transports only downstream traffic where downstream traffic flows only from a core network to a user, and where said isolated VLAN transports only upstream traffic where upstream traffic flows only from a user to a core network;
   and where said community VLAN transports bi-directional traffic, where bi-directional traffic flows from a user to a core network and from a core network to a user 7. The method according to claim 5, wherein said second node is of an isolated interface type, and wherein said second criterion provides that:
   in case said monitoring message is received along said primary VLAN, said reply message has to be transmitted along said secondary VLAN, said secondary VLAN being an isolated VLAN where said primary VLAN transports only downstream traffic where downstream traffic flows only from a core network to a user, and where said isolated VLAN transports only upstream traffic where upstream traffic flows only from a user to a core network.

8. The method according to claim 5, wherein said second node is of a community interface type, and wherein said second criterion provides that:

in case said monitoring message is received along said secondary VLAN, said secondary VLAN being a community VLAN, said reply message has to be transmitted along said secondary VLAN where said community VLAN transports bi-directional traffic, where bi-directional traffic flows from a user to a core network and from a core network to a user.

9. The method according to claim 5, wherein said second node is further adapted to forward said monitoring message and/or said reply message along the same VLAN along which said monitoring message and/or said reply message has been received at said second node.

10. The method according to claim 1, wherein said second node is an intermediate node of said sequence of nodes.

11. The method according to claim 10, wherein said second node is of an interswitch type, and wherein said second criterion provides that:
in case said monitoring message is received along said primary VLAN, said reply message has to be transmitted along said secondary VLAN, said secondary VLAN being an isolated VLAN;
in case said monitoring message is received along said secondary VLAN, said secondary VLAN being an isolated VLAN, said reply message has to be transmitted along said primary VLAN where said primary VLAN transports only downstream traffic where downstream traffic flows only from a core network to a user, and where the isolated VLAN transports only upstream traffic where upstream traffic flows only from a user to a core network.

12. The method according to claim 11, wherein said second criterion is included into a type length value field of said monitoring message.

13. The method according to claim 12, wherein said type length value field comprises i) a type field being equal to a predefined set of values, with each value corresponding to a different type of message; a sub-field length; and iii) a sub-field value comprising a value transported by the message.

14. The method according to claim 13, wherein said sub-field value further comprises a sub-field Organizationally Unique Identifier.

15. The method according to claim 1, wherein said monitoring message is an Operation Administration Management—OAM—message.

16. A first node comprising
a port that transmits a monitoring message for monitoring bidirectional traffic, either along a primary VLAN or a secondary VLAN, according to a first pre-defined criterion based upon a type of said node wherein said monitoring message comprises a second pre-defined criterion that indicates a VLAN, selected from the primary VLAN and the secondary VLAN, along which a reply message is transmitted, wherein the first node resides in a private virtual local area network—VLAN—having at least the primary VLAN and the secondary VLAN, said node residing in a sequence of nodes supporting traffic bidirectionally propagating across said private VLAN.

17. The first node according to claim 16, wherein said port is further adapted to receive the reply message according to the second pre-defined criterion based upon a type of a second node of said sequence and upon the VLAN from which said monitoring message has been transmitted.

18. A second node comprising
a port that upon reception of a monitoring message for monitoring bidirectional traffic, transmits a reply message either along a primary VLAN or a secondary VLAN, according to a second pre-defined criterion based upon a type of said node and based upon a VLAN, selected from the primary VLAN and the secondary VLAN, from which said monitoring message has been received where the monitoring message comprises the second pre-defined criteria, wherein the second node resides in a private virtual local area network—VLAN—having at least the primary VLAN and the secondary VLAN, said second node being in a sequence of nodes supporting traffic bidirectionally propagating across said private VLAN.

19. A private virtual local area network (VLAN) including a primary VLAN and a secondary VLAN, said network comprising:
a first node in a sequence of nodes supporting traffic bidirectionally propagating across said private VLAN, wherein said first node comprises a port which is adapted to transmit a monitoring message for monitoring said traffic, either along said primary VLAN or said secondary VLAN, according to a first pre-defined criterion based upon a type of said node, and
a second node according to claim 18.

20. A private virtual local area network—VLAN—having at least a primary VLAN and a secondary VLAN comprising:
a first node in a sequence of nodes that transmits a monitoring message for monitoring said traffic, either along said primary VLAN or said secondary VLAN; and
the first node receives a reply message along a VLAN different from the VLAN along which said monitoring message has been transmitted wherein said monitoring message comprises a field indicating said different VLAN along which said reply message is transmitted.

21. The first node according to claim 20, wherein said first node is an interface node, where an interface node comprises a port which acts as an interface between the private VLAN and a network device external to the private VLAN.

22. A node of a private virtual local area network—VLAN—having at least a primary VLAN and a secondary VLAN, said node being in a sequence of nodes supporting traffic bidirectionally propagating across said private VLAN, comprising:
upon reception along said primary VLAN or said secondary VLAN of a monitoring message for monitoring said traffic, the node transmits a reply message along a VLAN different from the VLAN from which said monitoring message has been received wherein said monitoring message comprises a field indicating to said node said different VLAN along which said reply message is transmitted.

* * * * *